United States Patent [19]
Hattori

[11] Patent Number: 5,101,351
[45] Date of Patent: Mar. 31, 1992

[54] AUTONOMOUS VEHICLE USING FUZZY CONTROL

[75] Inventor: Akira Hattori, Kanagawa, Japan

[73] Assignee: Nissan Motor Company, Limited, Yokohama, Japan

[21] Appl. No.: 507,572

[22] Filed: Apr. 11, 1990

[30] Foreign Application Priority Data

Apr. 12, 1989 [JP] Japan .................................. 1-90572

[51] Int. Cl.$^5$ ............................................ G06F 15/50
[52] U.S. Cl. ................................ 364/424.02; 180/167; 180/169
[58] Field of Search ...................... 364/424.01, 424.02, 364/513; 358/103; 180/167–169

[56] References Cited

U.S. PATENT DOCUMENTS

| | | | |
|---|---|---|---|
| 4,652,803 | 3/1987 | Kamejima et al. | 318/587 |
| 4,809,175 | 2/1989 | Hosaka et al. | 364/424.02 |
| 4,819,169 | 4/1989 | Saitoh et al. | 364/424.02 |
| 4,842,342 | 6/1989 | Takahashi et al. | 303/102 |
| 4,862,047 | 8/1989 | Suzuki et al. | 318/587 |
| 4,926,346 | 5/1990 | Yokoyama | 364/518 |
| 4,954,962 | 9/1990 | Evans, Jr. et al. | 364/513 |
| 4,970,653 | 11/1990 | Kenue | 364/461 |

OTHER PUBLICATIONS

Zadeh, "Making Computers Think Like People", Aug. 1984, pp. 26–32, IEEE Spectrum.

*Primary Examiner*—Thomas G. Black
*Attorney, Agent, or Firm*—Leydig, Voit & Mayer

[57] ABSTRACT

An autonomous vehicle controls the steering of the vehicle on a road by fuzzy control. A camera forms an image of the road, and an image processor processes the image to calculate the deviation dx between a plurality of reference points on a road and the direction in which the vehicle is traveling. Each reference point is associated with a visual point on the road ahead of the vehicle. The product of the deviation dx for each visual point and a membership function $\mu$ indicating the degree of importance attached to the visual point is calculated, and a total deviation equal to the sum of the products is calculated. The steering of the vehicle is controlled on the basis of the total deviation. The membership functions $\mu$ are varied in accordance with the time rate of change of the deviations dx.

16 Claims, 5 Drawing Sheets

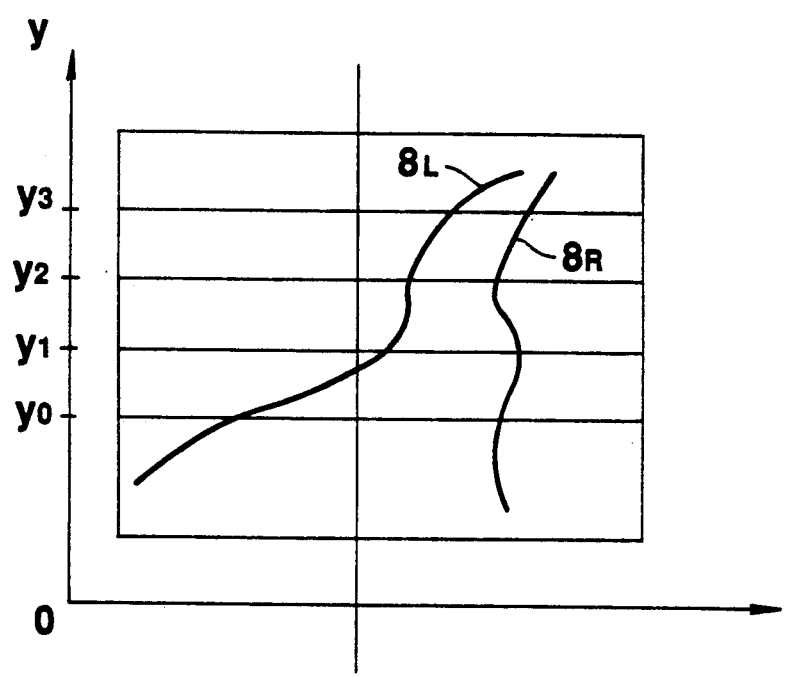

AUTONOMOUS VEHICLE USING FUZZY CONTROL

BACKGROUND OF THE INVENTION (1) Field of the Invention

The present invention relates generally to an vehicle which runs autonomously on a route of travel toward a destination using a fuzzy control method.

(2) Background Art

Japanese Patent Application First Publication (JP-A1) Showa 62-162113 published on July 18, 1987 and Japanese Utility Model Registration Application First Publication (JP-A1) Heisei 1-15510 published on Oct. 25, 1989 exemplify a previously proposed autonomous vehicle running on a set route of travel.

A U.S. patent application Ser. No. 337,707 filed on Apr. 13, 1989 also exemplifies the previously proposed autonomous vehicle described above.

In Japanese Utility Model Application First Publication No. Heisei 1-15510, a camera which forms an image of the running route of the vehicle is installed on the vehicle to run the vehicle autonomously along a guide line, e.g., a white line on the route of travel.

In addition, in another previously proposed autonomous vehicle, a camera is used to observe left and right guide lines located in front of the vehicle at a constant distance and the steering wheel is driven so as to guide the vehicle between these guide lines.

Furthermore, the distance L at which the guidelines are observed is changed according to the vehicle speed V in the following way:

$$L = L_0(1 + \alpha \cdot V)$$

$L_0$, $\alpha$ denote constants.

However, although points to be visually observed can be changed according to vehicle speed in the previously proposed autonomous vehicle, only one visual point is scanned at one time, areas in front thereof being ignored. Therefore, the autonomous vehicle cannot remain in a centered position when running on a curved road or an S-shaped road. In addition, during operations such as driving on curved roads, the vehicle speed must be considerably reduced. Consequently, the running stability of the autonomous vehicle becomes reduced.

SUMMARY OF THE INVENTION

It is an object of the present invention to provide an autonomous vehicle which can run at a desired position on a curved road such as an S-shaped road and, which need not decelerate unnecessarily so as to maintain a good running stability.

It is another object of the present invention to provide a method for running such an autonomous vehicle.

An autonomous vehicle according to one form of the present invention comprises a) first means for forming an image of guide lines on a road on which the vehicle is to run and generating an imaging signal representative of the image; b) second means for receiving the imaging signal and setting a plurality of visual (image data) points, and for each visual point calculating the deviation of a reference point on the road from the direction toward which the vehicle is running; c) third means for storing a membership function on a degree of importance for each visual point with respect to vehicle speed; d) fourth means for multiplying the deviation for each visual point by the degree of importance for each visual point and deriving a total deviation for all visual points; and e) fifth means for carrying out steering control of the vehicle on the basis of the total deviation calculated by the fourth means.

An autonomous vehicle according to another form of the present invention comprises a) an imaging portion having a camera that forms an image of guide lines on a road on which the vehicle is running; b) an image processing portion processing an imaging signal derived from the camera; c) a map information storing portion storing map data and other map information for a route of travel on which the vehicle is to run; d) a general running control portion referring to map information derived from the map information portion and setting a basic controlled variable as a basic steering displacement instruction $\Delta S_T$ on the basis of route data derived from map information; e) a steering control portion using various membership functions stored in a membership function storing portion, deriving a steering displacement instruction $\Delta S_g$ which is different from the basic steering displacement instruction $\Delta S_T$ set by the general running control portion via a fuzzy control program, and outputting the sum of the steering displacement instructions $\Delta S_T + \Delta S_g$; f) a steering drive portion for driving the steering wheel of the vehicle to a position determined using the steering displacement instruction output by the steering control portion; and g) a membership function storing portion storing a single visual point membership function for the fuzzy control program and multi-visual point membership functions for the fuzzy control program.

A method for autonomously running a vehicle, according to the present invention comprises forming an image of the steps of guide lines on a road on which the vehicle is running using a camera installed on the vehicle and outputting an imaging signal representative of the image; b) receiving the imaging signal and setting a plurality of visual (image data) points, and at each visual point calculating the deviation of a reference point on the road from the direction toward which the vehicle is running; c) storing a membership function on a degree of importance for each visual point with respect to vehicle speed; d) multiplying the deviation for each visual point by the degree of importance for each visual point and deriving a total deviation for all visual points; and e) carrying out steering control of the vehicle on the basis of the total deviation calculated by the fourth means.

BRIEF DESCRIPTION OF THE DRAWINGS

FIG. 8 is an explanatory view of imaging data when the autonomous vehicle runs on an S-shaped road.

DETAILED DESCRIPTION OF THE PREFERRED EMBODIMENT

Reference will hereinafter be made to the drawings in order to facilitate a better understanding of the present invention.

Figure 1:
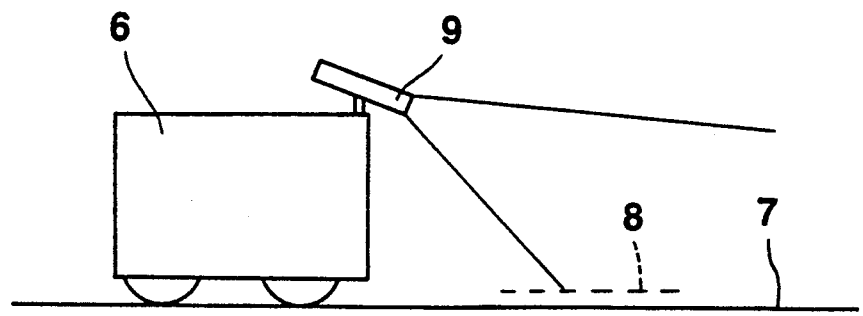
FIG. 1 is a shematic view of an autonomously running vehicle in a preferred embodiment according to the present invention.

FIG. 1 shows the outer appearance of an autonomous vehicle in a preferred embodiment of to the present invention.

In FIG. 1, a camera 9 is installed on a vehicle body 6 for forming an image of guide lines 8 such as a road edge or white lines provided on a road 7.

Figure 2:
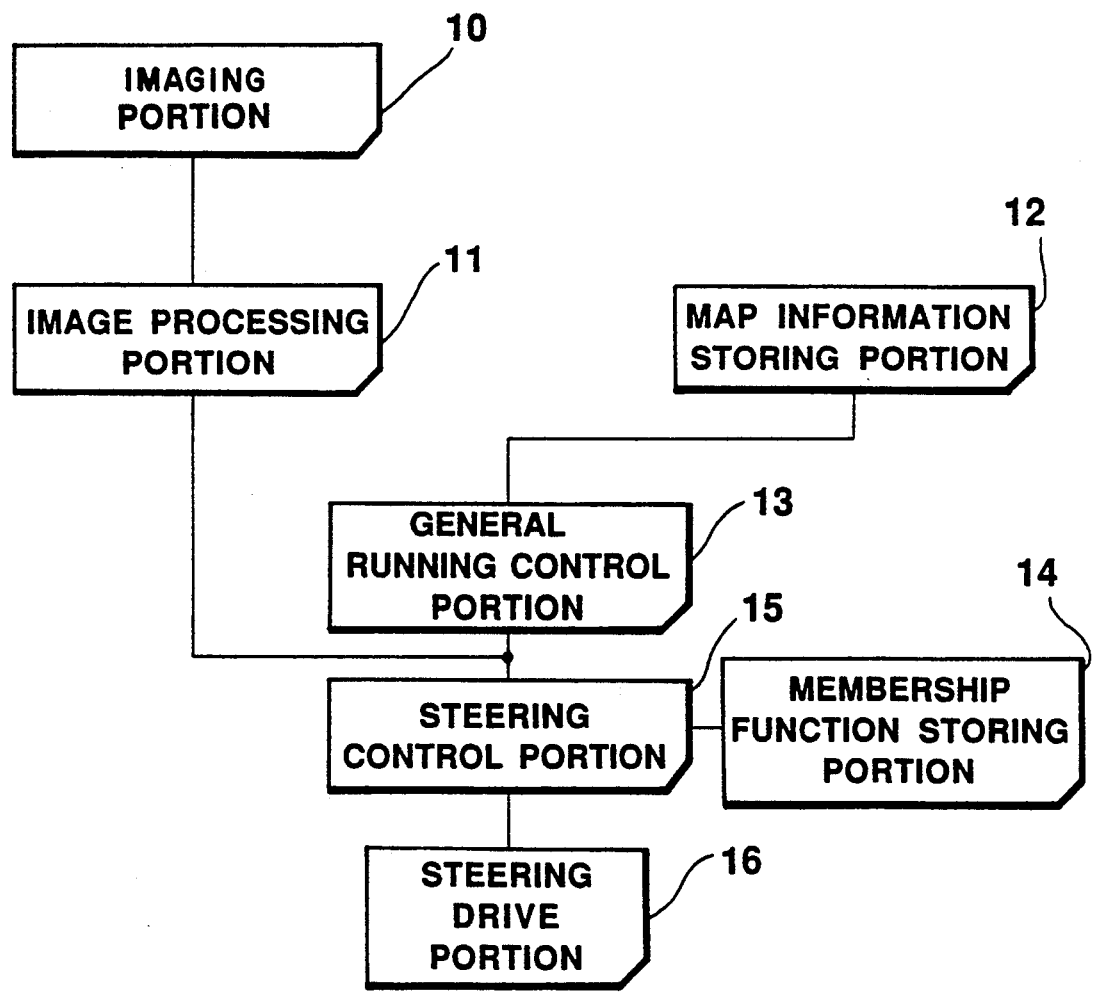
FIG. 2 is a functional block diagram of a control device for an autonomous vehicle in the preferred embodiment according to the present invention.

FIG. 2 shows a control device which is arranged in the autonomous vehicle body 6.

The control device includes an imaging portion 10 including the camera 9, an image processing portion 11 which processes the image from the imaging signal derived by the camera 9, a general running controller 13 connected to a map information portion 12, a steering control portion 15 connected to a membership function storing portion 14, and a steering drive portion 16.

The map information storing portion 12 stores map data on a route of travel as well as other information on the route of travel.

The general running control portion 13 refers to the map information derived from the map information storing portion and sets a basic controlled variable for steering on the basis of route data such as road contour and for the presence of different types of guide lines such as curbs or white lines.

Namely, the general running control portion 13 defines a start point and end point of a running interval on a relatively simple route such as a straight road or a simple circular curved road and sets a steering displacement instruction $\Delta S_T$ (a function of distance) in this interval as a basic controlled steering variable.

The steering control portion 15 uses various kinds of membership functions stored in the membership function storing portion 14 and derives a steering displacement instruction $\Delta S_g$, which is different from the steering displacement instruction $\Delta S_T$ set in the general running control portion 13, via a fuzzy control program. The sum of both steering displacement instructions $\Delta S_T$ and $\Delta S_g$ ($\Delta S_T + \Delta S_g$) is supplied to the steering drive portion 16.

The membership function storing portion 14 may store a membership function from the fuzzy control program for a single visual point or multiple membership functions from the fuzzy control program for a plurality of visual points as required by the complexity of the route of travel.

The fuzzy control program in the single visual point mode is applied to, e.g., a plurality of control rules with respect to all deviation quantities $\Delta X$, $\Delta \theta$ indicated by:

if $\Delta X$ is X and $\Delta \theta$ is $\theta$ then $\Delta S = A (\Delta X, \Delta \theta)$, wherein $\Delta X$ denotes the position deviation in the lateral direction and $\Delta \theta$ denotes the angular deviation in the forward lateral direction $L_m$. Then, the fuzzy control program derives a degree of importance for each rule with respect to the magnitudes of actual deviations $\Delta X$ and $\Delta \theta$ by a membership value of the membership function set for each deviation and calculates a steering displacement instruction $\Delta S_g$ from a weighted mean of all rules. Since fuzzy control from a single visual point is well known in the art, a detailed explanation of the fuzzy control program in the single visual point mode will be omitted here.

The steering control portion 15 switches the control method in such a way that during running on a straight road the single view-point method is used and during running on a curved road, the multi-visual point method is used, the method being selected according to road conditions on the road 7 as derived from the image processing portion 11 or according to instructions from the general running control portion 13.

The steering drive portion 16 drives the steering wheel of the vehicle in response to the steering displacement instruction $\Delta S$ output by the steering control portion 15 in accordance with the magnitude $\Delta S$ of the instruction.

Figure 3:
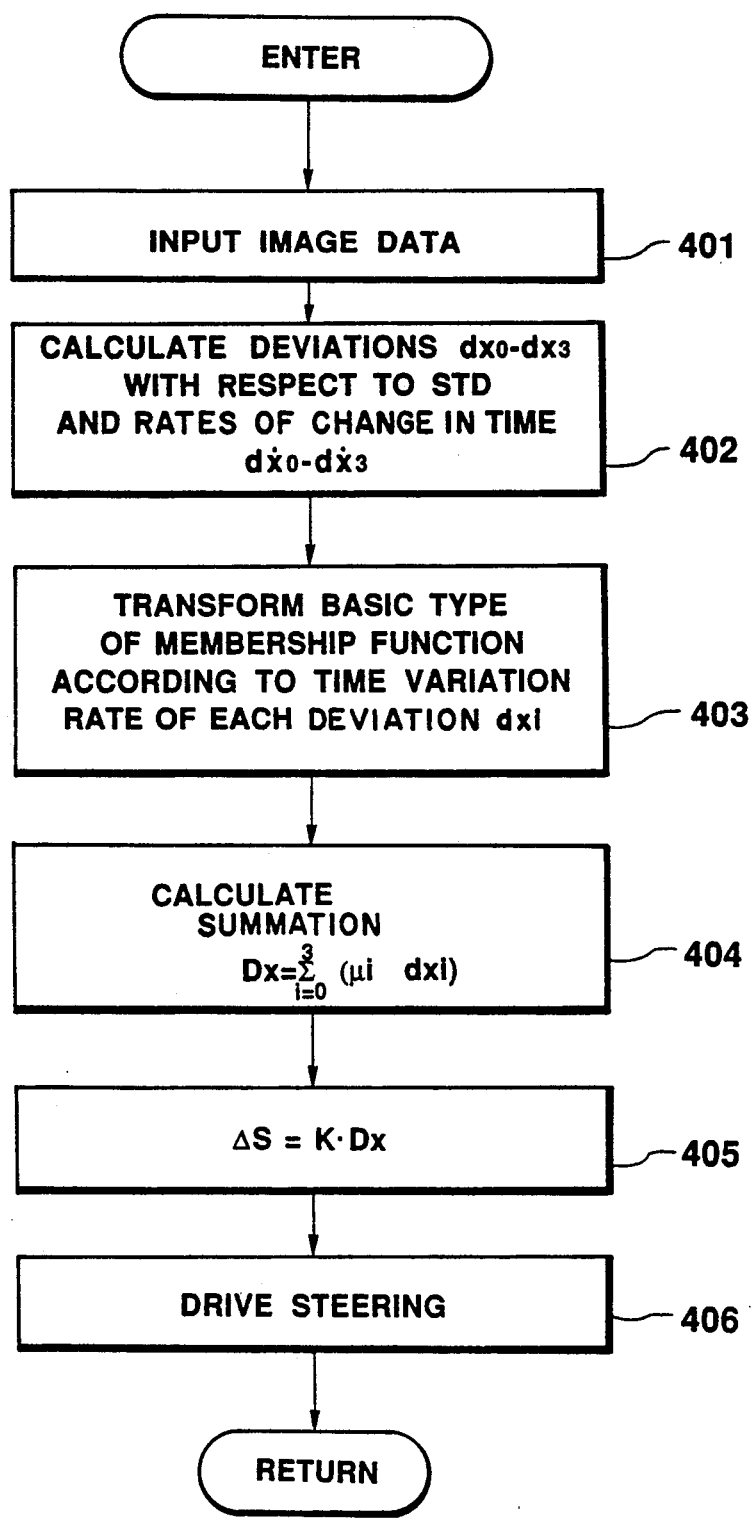
FIG. 3 is an operational flowchart of a steering control method utilizing a plurality of visual points.

FIG. 3 shows a flowchart indicating the steering control method in the multi-visual point mode.

In the preferred embodiment, four visual points in front of the vehicle separated by a constant interval of $y_i$ ($i=0, 1, 2, 3$) meters are monitored with respect to the instantaneous position of the vehicle 6. In other words, the distance interval $y_i$ between the vehicle 6 and the first visual point is substantially equal to the distance interval $y_i$ between the first visual point and the second visual point, etc. up to a maximum of four visual points for example.

Figure 4:
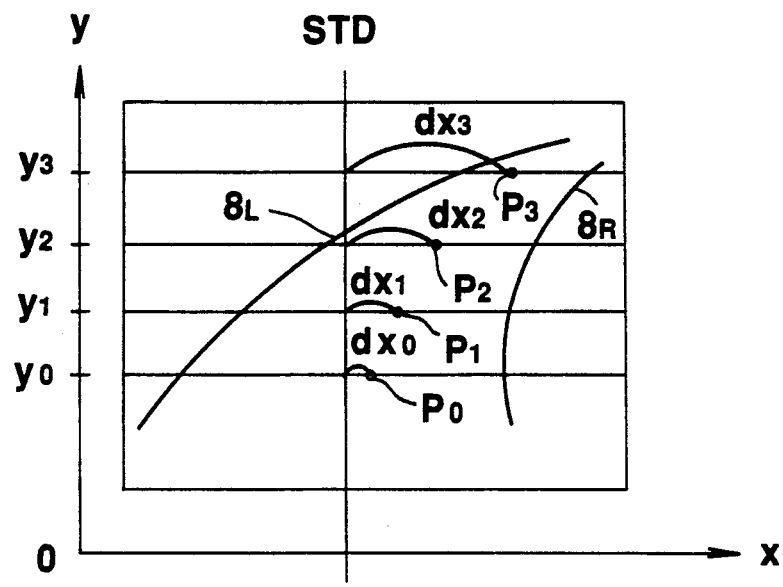
FIG. 4 is an explanatory view of imaging data.

In step 401, the control device inputs imaging data on left and right guide lines $8_L$ and $8_R$ as shown in FIG. 4.

In step 402, the control device derives the deviation (positional deviation) $dx_i$ ($i=0, 1, 2, 3$) between a reference point $P_i$ ($i=0, 1, 2, 3$) at the center of the road at each visual point and a reference line STD indicating the forward direction of the vehicle and compares each deviation $dx_i$ with that of the previous control period so as to derive the rate of change $d\dot{x}_i$ ($dx/dt\ i$) with respect to time ($i=0, 1, 2, 3$). The rate of change with respect to time denotes the difference between the present deviation and that at the previous control period, indicating the change in the radius of curvature of the road.

Figure 5:
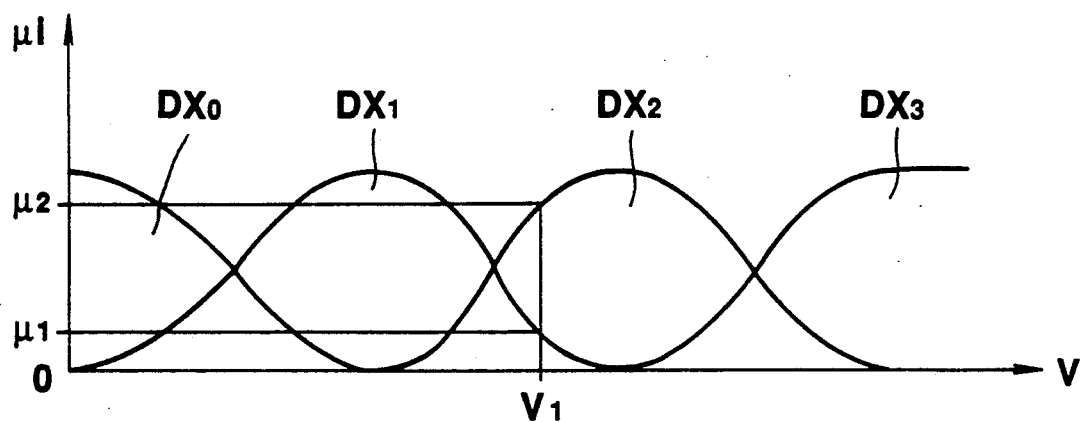
FIG. 5 is an explanatory view of a membership function used in a multi-visual point control operation.
Figure 6:
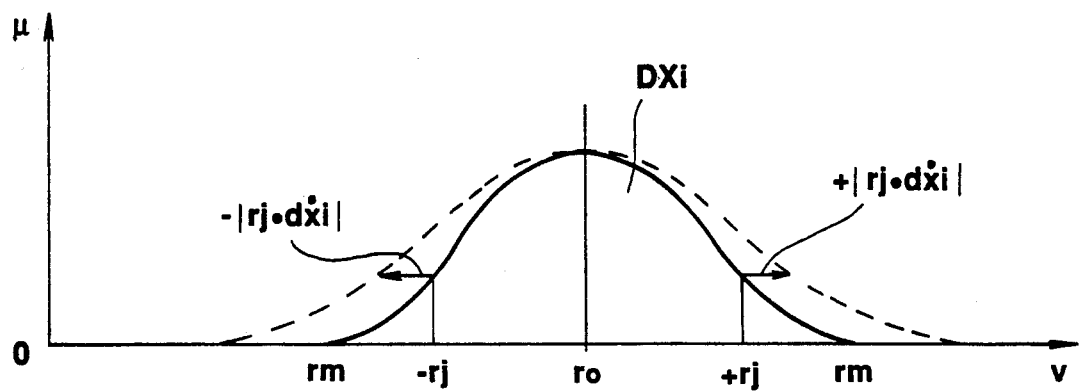
FIG. 6 is an explanatory view of a modified algorithm of the membership function.

In step 403, the membership functions shown in FIG. 5 are modified by the procedure shown in FIG. 6 according to the rate of change $dx_i$ of each deviation $dx_i$.

Namely, the membership functions shown in FIG. 5 are stored in the membership function storing portion 14 and distinguished from the single membership function utilized for a straight road. The degree of importance of each visual point $y_i$ at a vehicle speed V is indicated by a membership value $\mu_i$ ($i=0, 1, 2, 3$).

In addition, the width $|rj|$ between the visual points is caused to change by a quantity $|r_i \times d\dot{x}_i|$ which is the product of the width $|rj|$ of each membership function $DX_i$ and a corresponding time rate of change $dx_i$.

Hence, in step 403, the membership functions $DX_i$ shown in FIG. 5 are modified according to the rate of change $dx_i$ indicating the change in the radius curvature of a curved road. Then, calculation of the degree of importance of the visual points by a membership value $\mu_i$ is completed. For example, if the present vehicle speed is $V_1$ as shown in FIG. 5, the membership value $\mu_1$ indicating the degree of importance of the deviation quantity $dx_1$ at $y_1$ is 0.2. This corresponds to visual point $y_1$ of FIG. 4. The membership value $\mu_2$ indicating the degree of importance of the deviation quantity $dx_2$ at $y_2$ is 0.8. This corresponds to visual point $y_2$ of FIG. 4. (It is noted that the degrees of importance for the deviations $dx_o$ and $dx_3$ are zeroe in the case shown in FIGS. 4 and 5.)

Figure 7:
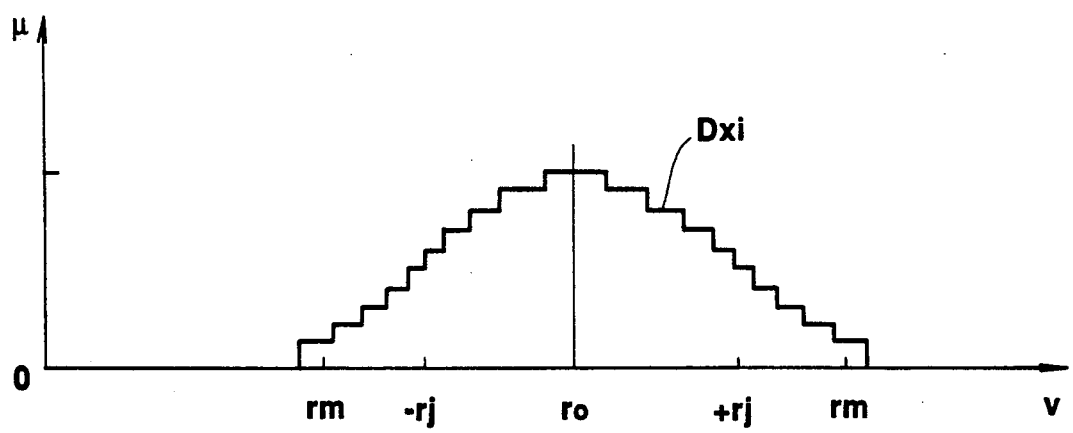
FIG. 7 is an explanatory view of the membership function expressed as dispersion data.

In addition, in a case where modification is made to the membership function $DX_1$, as shown in FIG. 6, the degree of importance of visual point $y_1$ is changed from 0.2 to 0.3 in the case shown in FIG. 7 (since the rate of change of the deviation becomes larger).

The membership functions may be calculated as a form of dispersion data as shown in FIG. 7.

Namely, the calculation of the dispersion data may be modified by changing its maximum value by $\pm r$ m. Then, various types of calculations may easily be carried out.

Next, in step 404, a total Dx of each deviation dxi is calculated by the following equation:

$$Dx = \Sigma(\mu_i \cdot dx_i) \quad (i = 0, 1, 2, 3)$$

Next, in step 405, a constant K is multiplied by the total sum Dx.

In step 405, the product $K \times D_x$ is set as a steering displacement instruction $\Delta S_g$. In step 406, the steering is driven in response to the final instruction $\Delta S$ which is derived from the steering instruction $\Delta S_g$.

Namely, $\Delta S = \Delta S_g$ when $\Delta S_T = 0$

As described above, at visual point $y_1$, appropriate steering control can be carried out with the deviation Dx totally derived from a plurality of visual points, even if the vehicle runs on an S-shaped road as shown in FIG. 8.

Since the degree of importance of visual points at a curved portion having a large radius of curvature is increased, the vehicle can autonomously run with stability along S-shaped roads.

The degree of importance of the visual points is changed according to the instantaneous vehicle speed as shown in FIG. 5 so that there is no need to reduce vehicle speed even if the vehicle runs on a curved road.

In the preferred embodiment, although the steering controlled variable $\Delta S$ is set only by the value of the product $K \times Dx$, the steering variable may be determined by both Dx and the basic steering instruction $\Delta S_T$ input from the general running control portion 13.

In addition, although the steering displacement instruction $\Delta S_g$ is derived from fuzzy calculation, the total $D_\theta$ of the steering angle deviations $d\theta$ at the plurality of visual points yi may be derived in the same way that the total Dx of the positional deviations is derived as the other variable, a control rule in the form of "if Dx is X and $D_\theta$ is $\theta$ then A $(X, \theta)$ may be applied, and the displacement instruction $\Delta S_g$ may be derived by means of hierarchal fuzzy calculation.

As described hereinabove, since in the autonomous vehicle according to the present invention, steering control can be carried out according to the radius of curvature of any curved road on which the vehicle runs, stable running characteristics can be achieved on both curved and straight roads without the need to reduce vehicle speed.

It will fully be appreciated by those skilled in the art that the foregoing description has been made in terms of the preferred embodiment and various changes and modifications may be made without departing from the present invention which is defined by the appended claims.

What is claimed is:

1. An autonomous vehicle comprising:
   a) first means for forming an image of guide lines on a road on which the vehicle is to run and generating an imaging signal representative of the image;
   b) second means for receiving said imaging signal and setting a plurality of visual points in the image, and for each visual point calculating the deviation between a reference point on the road between the guide lines and the direction toward which said vehicle is running, each reference point being associated with one of the visual points;
   c) third means for storing a membership function on a degree of importance for each visual point with respect to vehicle speed;
   d) fourth means for calculating the product of the deviation for each visual point calculated by the second means and the degree of importance for each visual point stored in the third means and calculating a total deviation for all the visual points equal to the total of the products; and
   e) fifth means for carrying out steering control of said vehicle on the basis of the total deviation calculated by said fourth means.

2. An autonomous vehicle as set forth in claim 1 wherein said fourth means includes sixth means for deriving the rate of change of each deviation on the basis of updated deviations.

3. An autonomous vehicle as set forth in claim 2 wherein said fourth means includes seventh means for varying the membership function for one of the visual points according to the rate of change of the corresponding deviation derived by said sixth means.

4. An autonomous vehicle as set forth in claim 3 wherein the second means calculates the deviation of each reference point on the road from a line indicating the direction toward which the vehicle is running based on imaging data representing the line.

5. An autonomous vehicle as set forth in claim 3 wherein the second means calculates the deviation of each reference point on the road based on a steering angle of the vehicle.

6. An autonomous vehicle as set forth in claim 1 wherein the position of each reference point on the road relative to the guide lines is constant for each reference point.

7. An autonomonous vehicle as set forth in claim 1 wherein each reference point on the road is located substantially midway between the guide lines.

8. An autonomous vehicle as set forth in claim 1 wherein each of the reference points lies on a line in the image which passes through one of the visual points and which is perpendicular to the direction toward which said vehicle is running.

9. An autonomous vehicle as set forth in claim 1 wherein each of the reference points is located on the road ahead of the vehicle.

10. An autonomous vehicle comprising:
    a) an imaging portion having a camera for forming an image of guide lines on a road on which the vehicle is running and generating an imaging signal representing the image;
    b) an image processing portion for processing the imaging signal from said camera;
    c) a map information storing portion storing map information for a route of travel on which said vehicle is to run;
    d) a general running control portion referring to map information derived from said map information portion and setting a basic controlled variable as a basic steering displacement instruction $\Delta S_T$ on the basis of route data derived from map information;
    e) a membership function storing portion storing a single visual point membership function for fuzzy control and multi-visual point membership functions for fuzzy control;

f) a steering control portion using membership functions stored in said membership function storing portion, deriving a steering displacement instruction $\Delta S_g$ via a fuzzy control program, and outputting a steering displacement instruction $\Delta S$ equal to the sum of the steering displacement instructions $\Delta S_T + \Delta S_g$; and g) a steering drive portion for driving a steering wheel of said vehicle to a position determined using the steering displacement instruction output by said steering control portion.

11. An autonomous vehicle as set forth in claim 10 wherein the steering control portion calculates the steering displacement instruction $\Delta S_g$ for a single visual point by applying a positional deviation $\Delta X$ and angular deviation $\Delta \theta$ in a lateral direction at a distance L ahead of the vehicle to a plurality of control rules for all deviations $\Delta X$, $\Delta \theta$ indicated by "if $\Delta X$ is X and $\Delta \theta$ is $\theta$ then $\Delta S = A (X, \theta)$", deriving a degree of importance for each rule with respect to magnitudes of actual deviations $\Delta X$ and $\Delta \theta$ by a membership value $\mu_i$ of the membership function for each deviation, and taking a weighted mean of all rules to derive the steering displacement instruction $\Delta S_g$.

12. An autonomous vehicle as set forth in claim 11 wherein the steering control portion comprises means for calculating the steering displacement instruction $\Delta S_g$ for a plurality of visual points by receiving imaging data from the image processing portion on left and right guide lines on the road on which the vehicle is to run, setting a plurality of visual points at constant intervals in a forward direction with respect to a present position of the vehicle, deriving a positional deviation $dx_i$ ($i = 0, 1, 2, 3, \ldots$) between a reference line STD indicating a straight ahead direction in which the vehicle is running and a center point $P_i$ ($i = 0, 1, 2, 3, \ldots$) of the road at each visual point, deriving the rate of change for each deviation $dx_i$ with respect to time, varying the membership function according to the rate of change $d\dot{x}_i$ for each deviation $dx_i$ so that the degree of importance for each visual point is given by a membership value $\mu_i$ corresponding to the current vehicle speed, calculating a total Dx of each deviation $dx_i$ using the equation $Dx = \Sigma(\mu_i \cdot dx_i)$, calculating the product of the total Dx and a constant K, and setting the steering displacement instruction $S_g$ equal to the product.

13. An autonomous vehicle as set forth in claim 11 wherein the steering control portion comprises means for calculating the steering displacement instruction $\Delta S_g$ by receiving imaging data on left and right guide lines on the road on which the vehicle is running from the image processing portion, setting a plurality of visual points at constant intervals in a forward direction with respect to a present position of the vehicle, deriving a steering deviation $d\theta_i$ ($i = 0, 1, 2, 3, \ldots$) between a reference line STD indicating a straight ahead direction in which the vehicle is running and a center point $P_i$ ($i = 0, 1, 2, 3, \ldots$) of the road at each of said visual points, deriving the rate of change of each deviation $d\theta_i$ with respect to time, varying the membership function according to the rate of change $d\dot{\theta}_i$ for each deviation $d\theta_i$ so that the degree of importance for each visual point is given by a membership value $\mu_i$ corresponding to the current vehicle speed, calculating a total $D\theta$ of each deviation $d\theta_i$ using the equation $D\theta = \Sigma(\mu_i \cdot d\theta_i)$, calculating the product of the total $D\theta$ and a constant K, and setting the steering displacement instruction $S_g$ equal to the product.

14. A method for autonomously running a vehicle comprising the steps of:

a) forming an image of guide lines on a road on which the vehicle is running using a camera installed on the vehicle and generating an imaging signal representative of the image;

b) receiving said imaging signal and setting a plurality of visual points in the image, and for each visual point calculating the deviation between a reference point on the road and the direction toward which said vehicle is running, each of the reference points being associated with one of the visual points;

c) storing a membership function on a degree of importance for each visual point with respect to vehicle speed;

d) calculating the product of the deviation for each visual point and the degree of importance for each visual point and calculating a total deviation for all visual points equal to the total of the products; and e) carrying out steering control of the vehicle on the basis of the total deviation calculated in step d).

15. A method as set forth in claim 14 wherein each of the reference points lies substantially midway between the guide lines.

16. An autonomous vehicle comprising:

a) imaging means for forming an image of a portion of a road on which the vehicle is running, the portion including guide lines;

b) processing means for processing the image to identify in the image a plurality of visual points on the road ahead of the vehicle and for each visual point calculating the deviation between one of a plurality of reference points on the road and the direction toward which said vehicle is running, each reference point being disposed between the guide lines ahead of the vehicle and lying on a line which is perpendicular to the direction in which the vehicle is travelling and which passes through one of the visual points;

c) storage means for storing a membership function on a degree of importance for each visual point with respect to vehicle speed;

d) means for calculating the product of the deviation for each visual point calculated by the processing means and the degree of importance for each visual point stored in the storage means and calculating a total deviation for all the visual points equal to the sum of the products; and e) steering control means for controlling the steering of the vehicle on the basis of the total deviation.

* * * * *